(12) United States Patent
Inada

(10) Patent No.: US 7,112,294 B2
(45) Date of Patent: Sep. 26, 2006

(54) METHOD OF PRODUCING CERAMIC BODY

(75) Inventor: Hiromi Inada, Mie-pref. (JP)

(73) Assignee: Denso Corporation, Kariya (JP)

( * ) Notice: Subject to any disclaimer, the term of this patent is extended or adjusted under 35 U.S.C. 154(b) by 401 days.

(21) Appl. No.: 10/158,933

(22) Filed: Jun. 3, 2002

(65) Prior Publication Data
US 2002/0180121 A1  Dec. 5, 2002

(30) Foreign Application Priority Data
Jun. 1, 2001  (JP)  ............................. 2001-167177

(51) Int. Cl.
*C04B 33/32*  (2006.01)
(52) U.S. Cl. ..................... 264/37.3; 264/678
(58) Field of Classification Search ................ 264/678, 264/651, 37.1, 37.29, 37.3, 219
See application file for complete search history.

(56) References Cited

U.S. PATENT DOCUMENTS

| | | | | |
|---|---|---|---|---|
| 3,631,131 A | * | 12/1971 | Kopko | .................... 521/140.5 |
| 4,851,376 A | * | 7/1989 | Asami et al. | ............... 501/119 |
| 5,458,833 A | * | 10/1995 | Hammer et al. | ........... 264/658 |
| 5,518,255 A | * | 5/1996 | Seike et al. | .................. 277/534 |
| 5,679,292 A | * | 10/1997 | Nisimura | ..................... 501/119 |
| 5,779,743 A | * | 7/1998 | Wood | ........................... 51/309 |
| 6,146,560 A | * | 11/2000 | Behi et al. | .................. 264/37.1 |
| 6,776,954 B1 | * | 8/2004 | Stevenson et al. | ............ 419/30 |
| 2002/0053751 A1 | * | 5/2002 | Cho | ............................. 264/71 |
| 2004/0151872 A1 | * | 8/2004 | Makino | ...................... 428/116 |

FOREIGN PATENT DOCUMENTS

JP  62207758  9/1987

* cited by examiner

*Primary Examiner*—Carlos Lopez
(74) *Attorney, Agent, or Firm*—Nixon & Vanderhye P.C.

(57) ABSTRACT

This invention provides a production method of a ceramic body that can use waste and defectives generated during a production process. The invention includes a dust removal step of removing dust below a predetermined particle size from granulated powder in a slurry, a molding step of molding the slurry containing granulated powder into a primary molded body, a cutting step of cutting the resulting primary molded body into a non-sintered molded body having a desired shape, a deflocculation step of deflocculating the dust removed in the dust removal step so that at least 50 wt % of particles having a particle size of not greater than 5 μm are contained, and mixing water to obtain a regenerated slurry, and a step of molding a non-sintered molded body from at least the regenerated slurry so obtained, and sintering it to obtain a ceramic body.

3 Claims, 8 Drawing Sheets

METHOD OF PRODUCING CERAMIC BODY

BACKGROUND OF THE INVENTION

1. Field of the Invention

This invention relates to a method of producing a ceramic body used for a solid electrolyte or an insulating substrate utilized for various gas sensor devices.

2. Description of the Related Art

A method of obtaining a ceramic body is well known and introduces a binder to a new starting powder to form a slurry and the resulting slurry is shaped to obtain a non-sintered molded body. In such a production method of the ceramic body, effective utilization of wastes and defective products occurring during the molding process has been required in recent years to reduce the material cost and to protect resources.

SUMMARY OF THE INVENTION

In view of the problems of the prior art technologies described above, this invention aims at providing a production method of a ceramic body that can re-use the wastes and defective products occurring during a production process.

According to a first aspect of the invention, there is provided a method for producing a ceramic body comprising a dust removal step of removing dust below a predetermined particle size from granulated powder in a slurry; a molding step of molding the slurry containing the granulated powder into a primary molded body; a cutting step of cutting the resulting primary molded body into a non-sintered molded body having a desired shape; a deflocculation step of deflocculating the dust removed in the dust removal step in such a fashion that at least 50% of particles having a particle size below 5 μm in terms of a weight ratio are contained, and mixing the dust with water to obtain a regenerated slurry; and a step of molding the non-sintered molded body from at least the resulting regenerated slurry, and sintering the non-molded body to obtain a ceramic body.

According to a second aspect of the invention, there is provided a method for producing a ceramic body comprising: a molding step of molding slurry containing granulated powder into a primary molded body; a cutting step of cutting the resulting primary molded body into a non-sintered molded body having a desired shape; a chip recovery step of recovering chips generated in the cutting step;

a deflocculation step of deflocculating the chips recovered in the recovery step in such a fashion that at least 50% of particles having a particle size below 5 μm in terms of a weight ratio are contained, and mixing the chips with water to obtain a regenerated slurry; and a step of molding the non-sintered molded body from at least the resulting regenerated slurry, and sintering the non-molded body to obtain a ceramic body.

According to a third aspect of the invention, there is provided a method for producing a ceramic body comprising: an inspection step of inspecting non-sintered molded bodies, and removing defective molded bodies; defective molded body recovery step of recovering the defective molded bodies rejected in the inspection step; a defloccu-lation step of deflocculating the defective molded bodies recovered in the defective molded body recovery step in such a fashion that at least 50% of particles having a particle size below 5 μm in terms of a weight ratio are contained, and mixing the deflocculated molded bodies with water to obtain a regenerated slurry; and a step of molding a non-sintered molded body from at least the resulting regenerated slurry, and sintering the non-molded body to obtain a ceramic body.

According to a fourth aspect of the invention, there is provided a method for producing a ceramic body comprising:

a dust removal step of removing dust below a predetermined particle size from granulated powder in a slurry; a molding step of molding the slurry containing the granulated powder into a primary molded body; a cutting step of cutting the resulting primary molded body into a non-sintered molded body having a desired shape; a deflocculation step of deflocculating the dust removed in the dust removal step in such a fashion as to form primary particles, and mixing the primary particles with water to obtain a regenerated slurry; the deflocculation step being conducted with vacuum deaeration; and a step of molding a non-sintered molded body from at least the resulting regenerated slurry, and sintering the non-sintered molded body to obtain a ceramic body.

According to a fifth aspect of the invention, there is provided a method for producing a ceramic body comprising: a slurry formation step of obtaining a new slurry from a granulation step for converting primary particles in the slurry to granulated powder; a dust removal step of removing dust below a predetermined particle size from the granulated powder in the slurry; a molding step of molding the slurry containing the granulated powder into a primary molded body; a cutting step of cutting the resulting primary molded body into a non-sintered molded body having a desired shape; a deflocculation step of deflocculating the dust removed in the dust removal step in such a fashion as to form primary particles, and mixing the primary particles with water to obtain a regenerated slurry; a mixing step of mixing the new slurry with the regenerated slurry, the mixing step being conducted in such a fashion as to introduce first the regenerated slurry and then to introduce alternately the new slurry and the regenerated; and a sintering step of sintering the non-molded body to obtain a ceramic body; wherein the granulation step from the second on is carried out by using a mixed slurry.

All of the first to fifth inventions recover the component containing new starting powder that occurs in the process for obtaining the ceramic body from the new starting powder and that has been discarded in the past, and form the non-sintered molded body by utilizing the regenerated slurry so obtained.

In other words, the first, fourth and fifth inventions remove the dust below a predetermined particle size from the granulated powder in the slurry in the dust removal step, but utilize the dust.

The second invention recovers the chips generated during cutting of the primary molded body and re-utilizes the chips. The third invention removes the defective molded bodies, that is, the molded bodies that exceed the tolerance of the size, etc, in the inspection step, and collects these defective molded bodies for reutilization.

Therefore, the first to fifth inventions can effectively utilize the new starting powder.

In this way, the invention provides a production method of a ceramic body that can reutilize wastes and defectives that occur during a production process.

DESCRIPTION OF THE PREFERRED EMBODIMENTS

Figure 1:
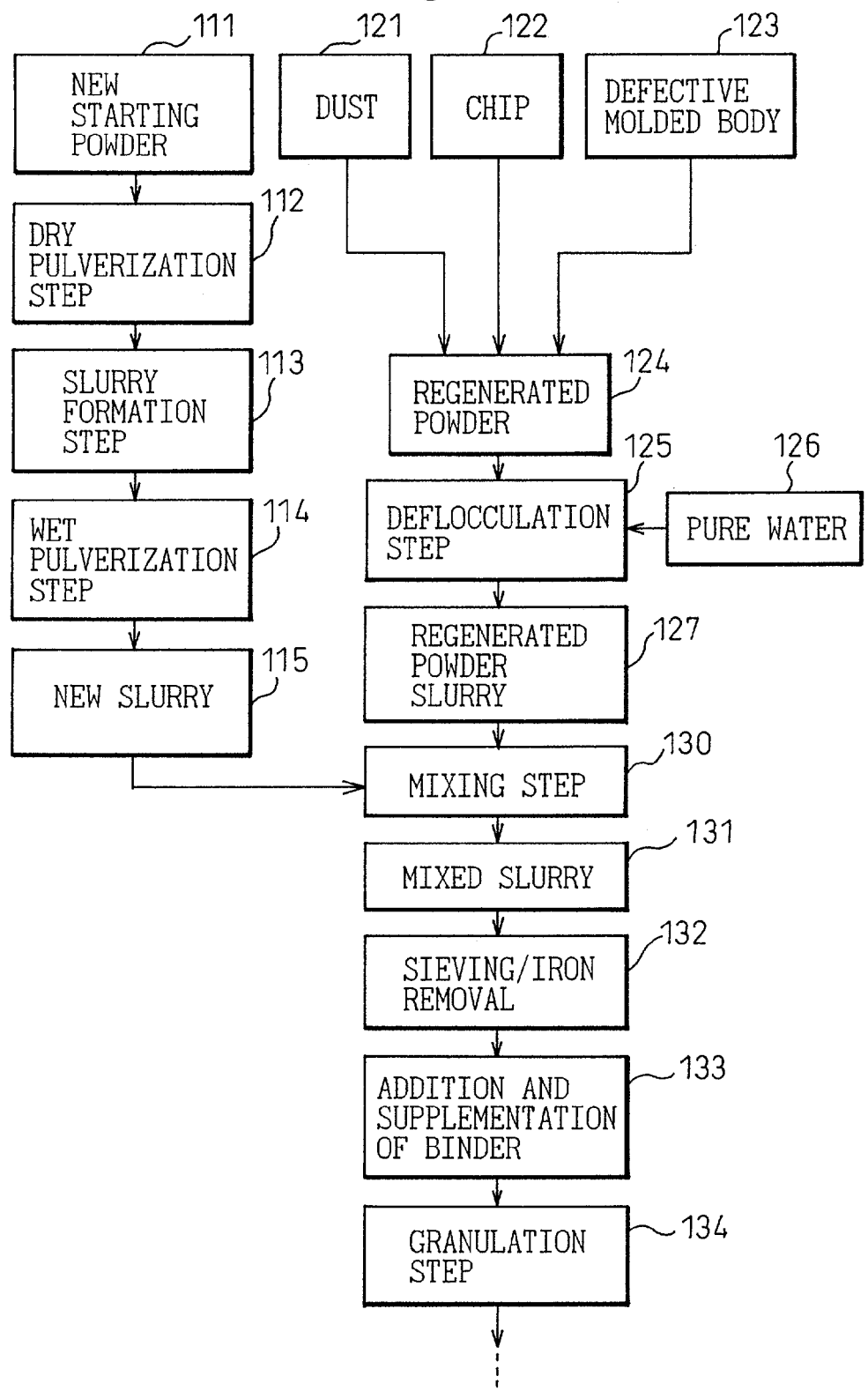
FIG. 1 is an explanatory view showing a process flow of a production method of a ceramic body according to Embodiment 1.

In the first aspect of the invention, dust removed in a dust removal step is deflocculated so that at least 50 wt % of particles having particle size of not greater than 5 μm are contained.

The particles having a particle size of not greater than 5 μm have substantially the same size as the primary particles in new starting powder. When at least 50 wt % of the dust is deflocculated to this particle size, the regenerated slurry can be brought into the same state as that of a new slurry.

When the amount of the particles having a particle size of not greater than 5 μm is less than 50 wt %, the resulting ceramic body does not have sufficient strength, and cracks, and the like, are likely to develop.

Most preferably, all the particles have a particle size of not greater than 5 μm.

Deflocculation described above can be conducted by using an agitator besides agitation using flat vanes and a biaxial butterfly (for detail, refer to each Embodiment).

As the flat vanes are used, the slurry can be agitated as a whole, and sufficient deflocculation can be accomplished.

As the biaxial butterfly is used, large flocs can be defloc-culated. As deflocculation and dispersion can be simultaneously attained, the invention can accomplish efficient deflocculation particularly when the slurry has a high viscosity.

When the agitator is used, a shearing force can be imparted to the slurry. Therefore, deflocculation can be efficiently conducted and the deflocculation speed can be improved.

In the second aspect of the invention, too, the cutting chips recovered in the chip recovery step are deflocculated so that at least 90 wt % of the cutting chips are occupied by the primary particles. The detail is the same as that of the first aspect of the invention.

In the third aspect of the invention, too, the defective molded bodies recovered in the defective molded body recovery step are deflocculated so that at least 50 wt % of particles having a particle size of not greater than 5 μm are contained. The detail is the same as that of the first aspect of the invention.

In the fourth aspect of the invention, a deflocculation step is carried out so that the dust removed in the dust removal step becomes primary particles, and regenerated slurry can be obtained by mixing water with the particles.

The deflocculation step is carried out under vacuum deaeration.

In other words, vessels and tools used for the deflocculation step are sealed, and the pressure of the interior is reduced by means of a vacuum pump, or the like.

Consequently, bubbles do not easily occur and granules having cavities are not formed, either. In this way, defects during molding can be prevented.

Next, the degree of vacuum in the deflocculation step described above is preferably from −53 to −80 kPa.

Therefore, deaeration is conducted under a state close to vacuum, and slurry almost free from bubbles can be obtained.

When the degree of vacuum is less than −53 kPa, deaeration is likely to be insufficient. When it exceeds −80 kPa, the slurry undergoes bubbling inside the deflocculation tank, and desired granulated powder cannot be easily obtained in the subsequent granulation step.

In the deflocculation step described above, deflocculation is preferably carried out so that at least 90 wt % of particles having a particle size of not greater than 2 μm are contained.

It is thus possible to obtain the effect similar to that of the new product (new starting) slurry.

When the amount of the particles having a particle size of 2 μm is less than 90 wt %, cracks are likely to occur in the ceramic body molded.

Most preferably, all the particles have a particle size of not greater than 2 μm.

It is preferred to mix the regenerated slurry described above with the new starting slurry obtained from the granulation step that converts at least the new powder into slurry and forms the primary particles in this slurry into the granulated powder.

In this case, the bubbling becomes less.

Incidentally, a temporary molded body can be formed from only the regenerated slurry.

In the fifth aspect of the invention described above, the regenerated slurry is first introduced in the mixing step and then the new slurry and the regenerated slurry are alternately introduced.

This procedure is repeated until the vessel used for the mixing step is filled with a desired amount of the slurry.

Bubbling hardly occurs when the regenerated slurry and the new slurry are mixed in this way. Consequently, granulated powder having cavities and holes are not formed easily and defects during molding can be prevented. The primary molded bodies molded from the granulated powder having cavities and holes are not desirable because the strength is insufficient and cracks are likely to occur.

In the fifth aspect of the invention, the slurries are introduced preferably dividedly at least thrice in the sequence of the regenerated slurry→new slurry→regenerated slurry. It is also possible to use the sequence of the new slurry→regenerated slurry→new slurry.

Next, Examples of the invention will be explained with reference to the drawings.

EXAMPLE 1

The production method of a ceramic body according to the invention will be explained with reference to FIGS. 1 to 8.

First, the outline of the production method will be explained.

This method includes a dry pulverizing step of preparing new starting powder and dry pulverizing the powder, a slurry formation step of forming slurry from the new starting powder so pulverized, a wet pulverizing step of stirring the slurry and obtaining new slurry and a granulating step of converting primary particles in the slurry to granulated powder.

The production method further includes a fine dust removal step of removing fine dust below a predetermined particle size from the granulated powder in the slurry.

Furthermore, the production method conducts a molding step of molding the slurry containing the granulated dust to a primary molded body and a cutting step of cutting the resulting primary molded body into a non-sintered body having a desired shape.

The production method conducts a chip recovery step of recovering the chips generated in the cutting step.

The production method conducts an inspection step of inspecting the non-sintered bodies and removing defective molded bodies, and a defective molded body recovery step of recovering the defective molded bodies removed in the inspection step.

Further, the production method conducts a deflocculation step of deflocculating the dust removed in the dust removal step, the chips recovered in the recovery step and the defective molded bodies recovered in the defective molded body recovery step so that at least 50 wt % of particles having a particle size of not greater than 5 µm can be contained, and mixing the particles with water to obtain regenerated slurry. The production method then conducts a mixing step of introducing the new slurry described above into the resulting regenerated slurry.

Finally, the non-sintered molded body obtained by the process described above is sintered to obtain a desired ceramic body. The mixed slurry is used in the second granulation step on.

Hereinafter, the invention will be explained in detail.

Figure 7:
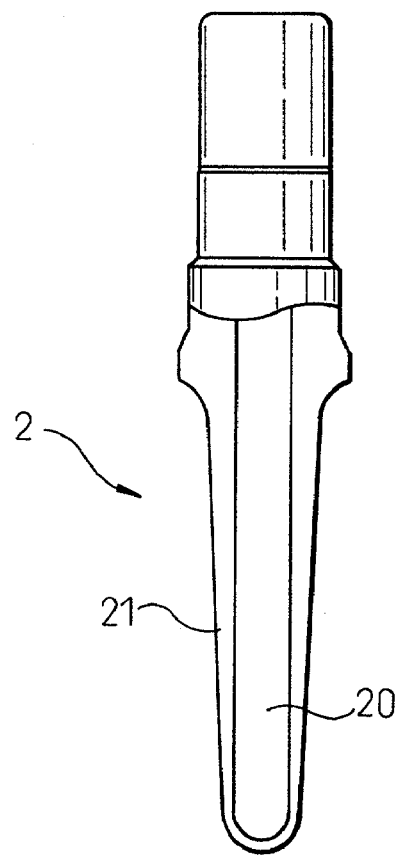
FIG. 7 is an explanatory view of a solid electrolyte in a gas sensor in Embodiment 1.
Figure 8:
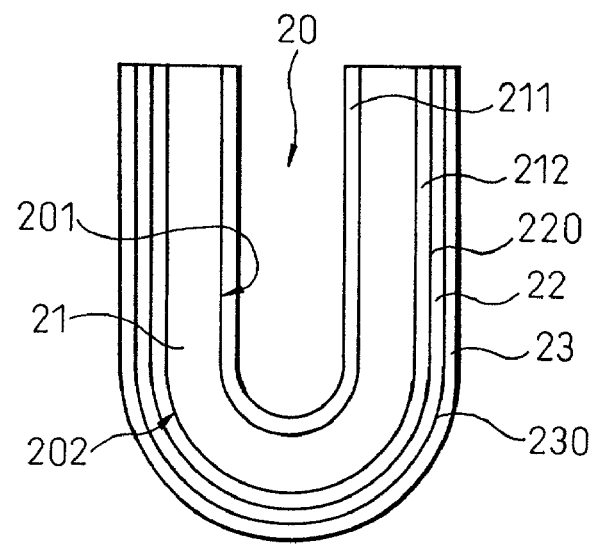
FIG. 8 is an explanatory view of principal portions of the gas sensor device in Embodiment 1.

The ceramic body in this example is used as an oxygen ion conductive solid electrolyte 21 having a bottomed cylindrical shape in a cup type gas sensor device 2 as shown in FIGS. 7 and 8.

The gas sensor device 2 includes the oxygen ion conductive solid electrolyte 21 made of zirconia, an external electrode 212 on a measured gas side, disposed on the outer surface 202 of the solid electrolyte 21 and an internal electrode 211 opposing a reference gas chamber 21 inside the solid electrolyte 21 into which atmospheric air as a reference gas is introduced during use.

A lead portion and a terminal portion (both not shown in the drawings) for taking out the output of the gas sensor device 2 are disposed integrally with the internal electrode 211 and with the external electrode 212 on the inner and outer surfaces 201 and 202, respectively.

Incidentally, the internal and external electrodes 211 and 212 are platinum electrodes.

An alumina ceramic spray layer 22 having certain air permeability is formed on the surface 220 of the external electrode 212 by plasma spraying. A porous layer 23 covers the surface 230 of this spray layer 22. The porous layer 23 is so constituted as to function as a trap layer that entraps poisonous substances contained in an exhaust gas as the measured gas. The spray layer 22 is so constituted as to function as a diffusion resistance layer that controls the arrival time and the arrival amount of the measured gas at the external electrode.

Next, a production setup of the ceramic body will be explained.

Figure 3:
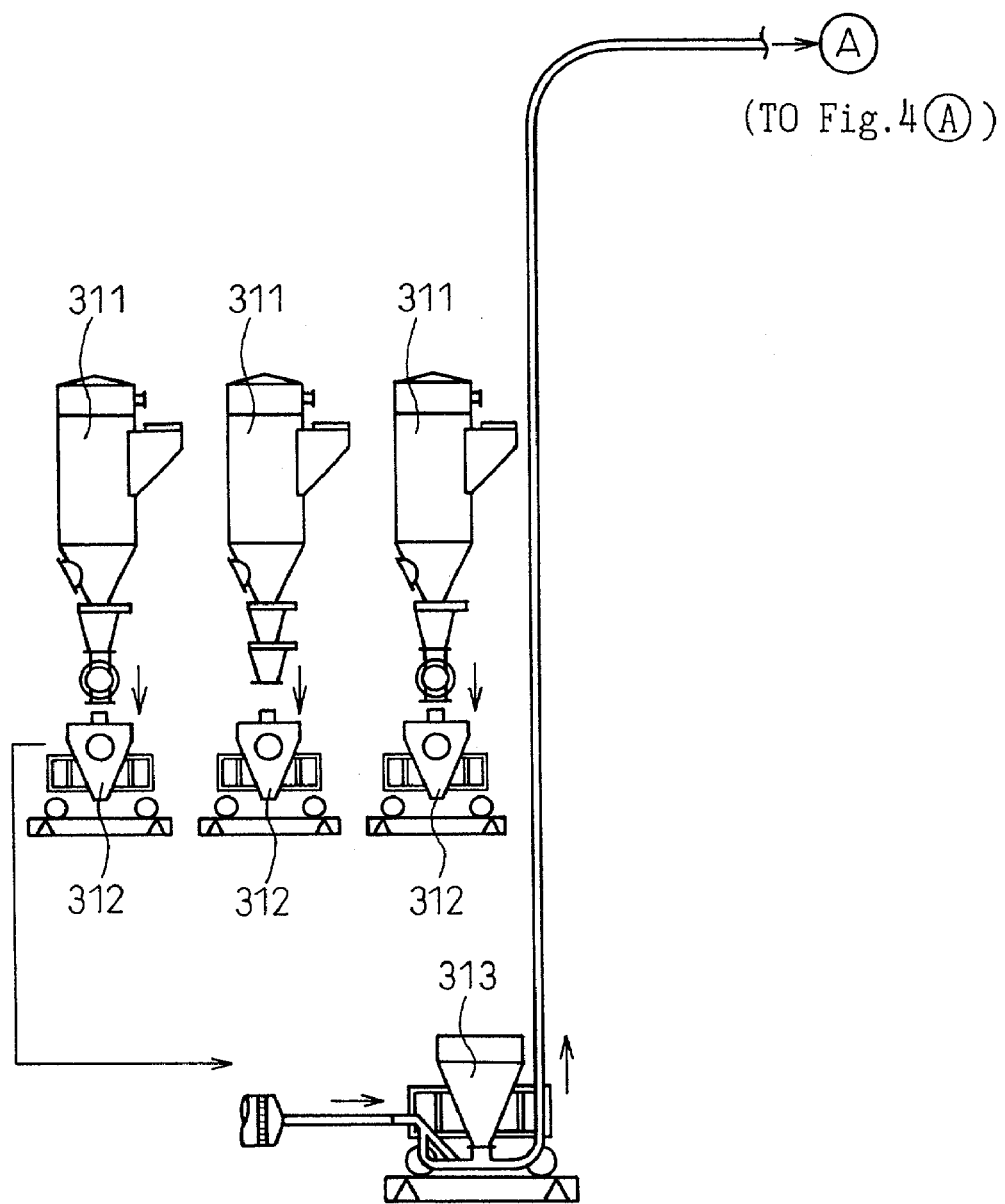
FIG. 3 is an explanatory view showing a production setup of the ceramic body in Embodiment 1.
Figure 4:
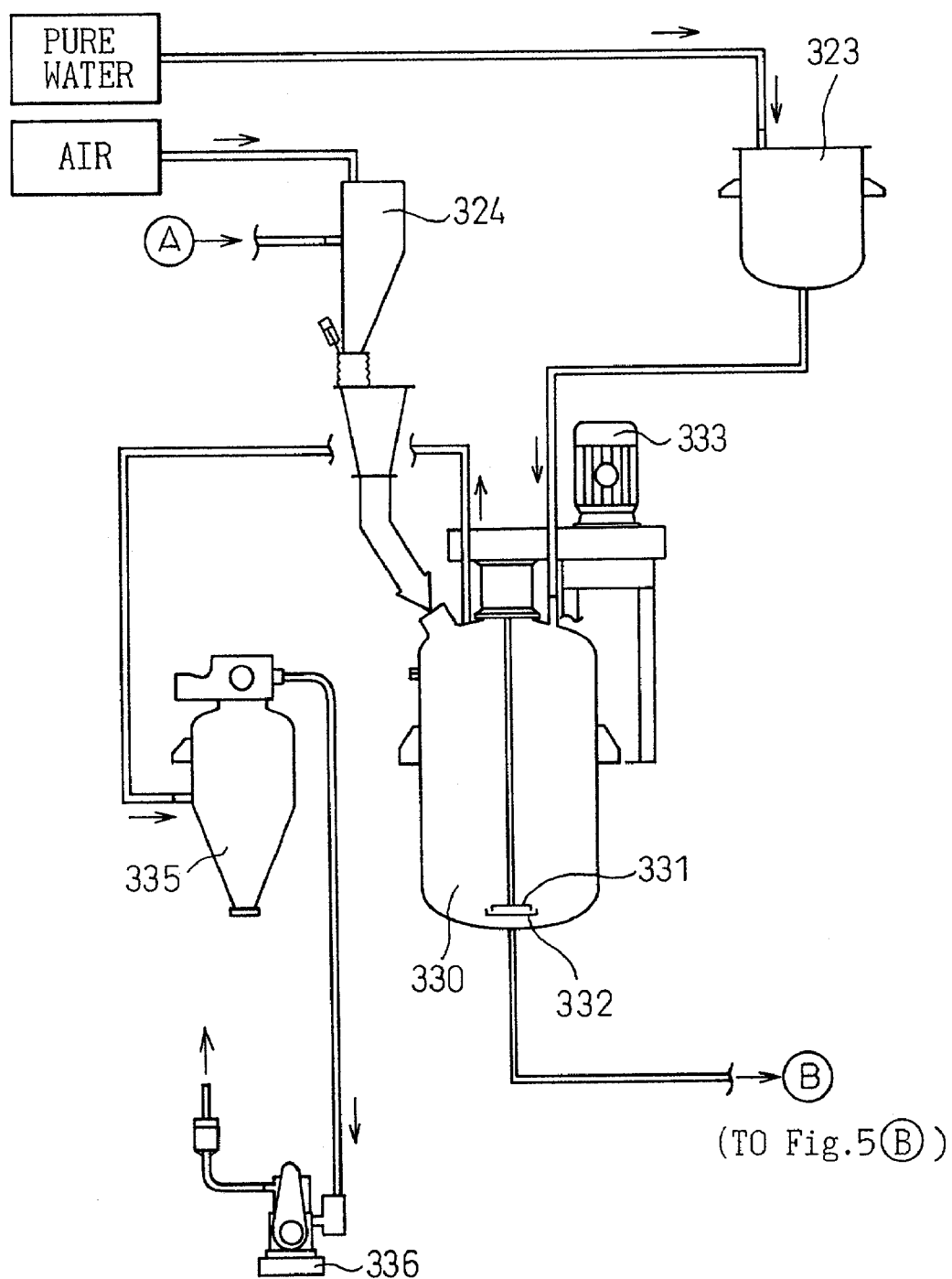
FIG. 4 is an explanatory view showing the production setup of the ceramic body in Embodiment 1, and continues from FIG. 3.
Figure 5:
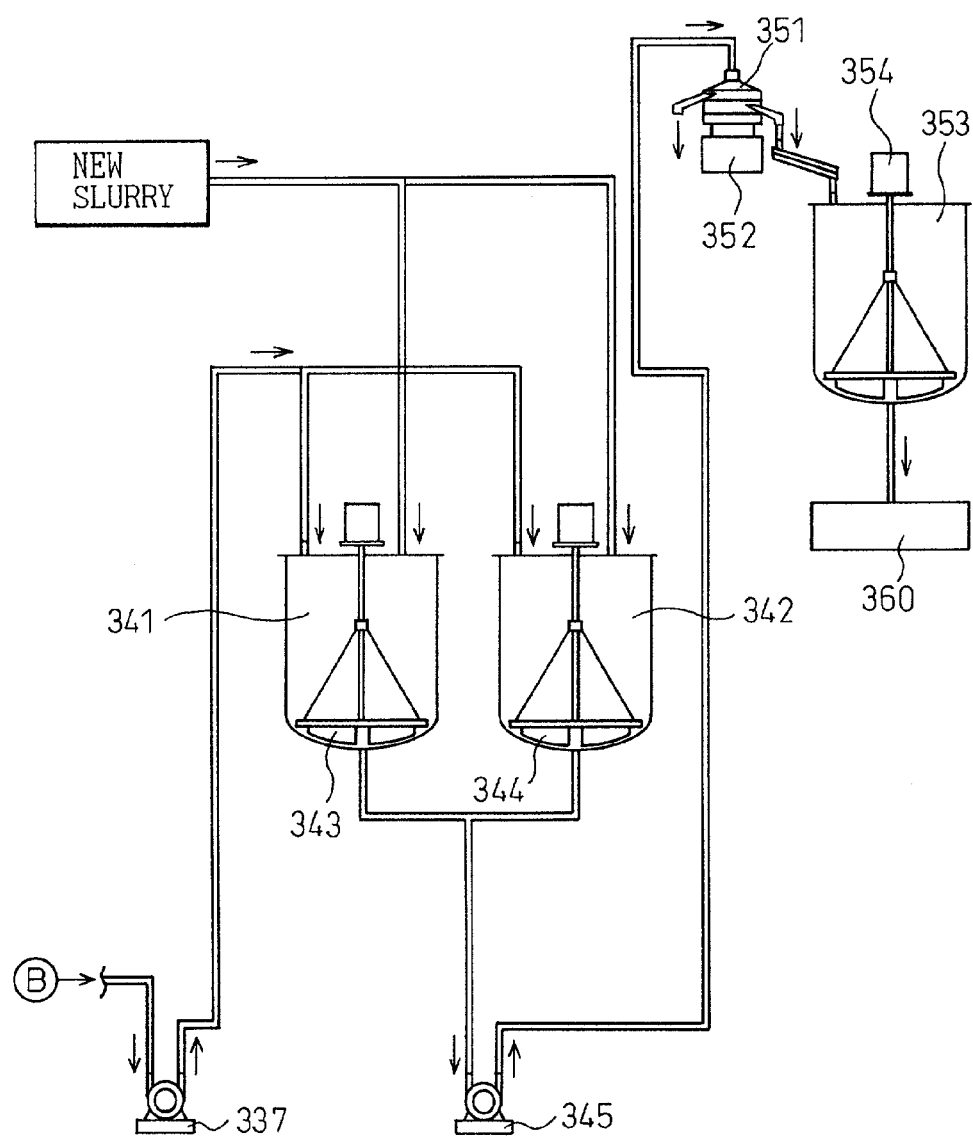
FIG. 5 is an explanatory view showing the production setup of the ceramic body in Embodiment 1, and continues from FIG. 4.

Incidentally, this production setup is dividedly shown in FIGS. 3 to 5, and symbols A, B and C in the drawings represent continuing portions.

Referring to FIG. 3, the production setup includes a tank 311 for storing dust, chips and defective molded bodies that are recovered, a platform 312 for conveying them by means of a strainer and a screw feeder, and a check platform 313 for conveying the content of the platform 312 while metering.

Referring to FIG. 4, the production setup includes a pure water tank 323 for storing pure water and feeding it to a deflocculation tank 330, whenever necessary, and a suction type conveying apparatus 324 for feeding the dust, the chips and the defective molded articles, using air, into the deflocculation tank 330.

The deflocculation tank 330 has an agitator. The agitator includes a driving portion 333, a rotor 331 and a stator 332.

Figure 6:
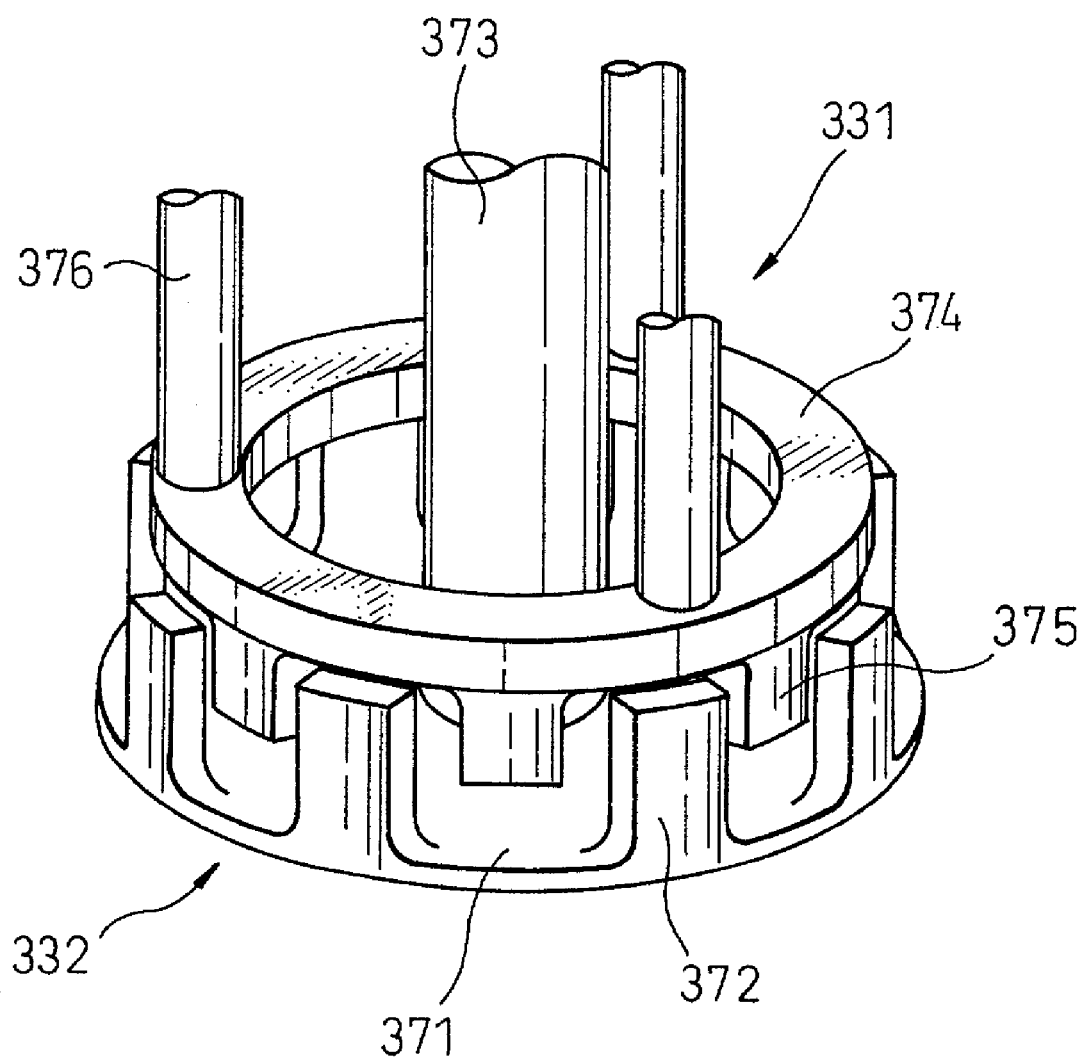
FIG. 6 is an explanatory view showing a rotor and a stator in an agitator in Embodiment 1.

FIG. 6 shows in detail the rotor 331 and the stator 332 of the agitator. As shown in the drawing, the rotor 331 has an annular main body 374, a plurality of projections 375 projecting downward from the annular main body 374 in the drawing, and three support shafts 376 projecting upward from the annular main body 374 in the drawing.

The stator 332 includes a disk-like main body 371 and a plurality of projections 372 provided to the outer periphery of the main body 371 and projecting upward in the drawing.

The diameter of the stator 332 is a little smaller than the diameter of the rotor 331. The rotor 331 is stored on the inner peripheral side of the projections 372 of the stator 332 and is allowed to rotate there.

The support shafts 376 provided to the rotor 331 are connected to a driving portion 333 outside the deflocculation tank 330, and the driving portion 333 drives the rotor 331 for rotation.

A vacuum pump 336 is disposed to achieve a reduced pressure inside the defloculation tank 330. A dust collector 335 is interposed between the defloculation tank 330 and the vacuum tank 336 to prevent the dust, the chips and the defective molded bodies reaching the vacuum pump 336 and damaging it.

Referring to FIG. 5, two slurry tanks 341 and 342 are shown into which the regenerated slurry is delivered from the defloculation tank 330. A feed pump 337 is interposed between the deflocculation tank and the slurry tanks 341 and 342 for feeding the regenerated slurry. Each slurry tank 341, 342 includes an agitator 343, 344. The regenerated slurry and the new slurry are mixed inside these slurry tanks 341 and 342, giving mixed slurry.

A feed pump 345 is disposed to feed the mixed slurry from the slurry tanks 341 and 342 to a service tank 353. A vibration sieve 351 and an iron-removing machine 352 are disposed on the upstream side of the service tank 353. A spray dryer 360 is connected to the service tank 353.

Next, the production method of the ceramic body in this example will be explained.

First, zirconia powder and yttria powder are prepared as new starting powder as shown in Step 111 in FIG. 1. Both are introduced into a vibration mill and a dry pulverizing step is carried out as in Step 112.

In consequence, the new starting powder is finely pulverized to a certain extent.

Next, water is poured into the new starting powder it is thus finely granulated. The mixture is then stirred to form slurry. This corresponds to a slurry formation step of Step 113. Incidentally, a binder has not yet been introduced at this point of time.

Next, the slurry is loosened by means of a vibration mill and is agitated as shown in Step 114, and a wet pulverization step is carried out.

In this way, a new slurry containing at least 90% of primary particles having a particle size of not greater than 2 μm is acquired as shown in Step 115.

Incidentally, the dust, the chips and the defective molded bodies collected in each intermediate step of Steps 121 to 123 are collected in the tank 311 shown in FIG. 3. They are transferred to the tank 311 to the platform 312 and then from the platform 312 to the check platform 313. While being metered, the dust, chips and molded bodies are transferred by air to the deflocculation tank. As the dust, the chips and the defective molded bodies are collected from mutually different positions of each process step, they are first stored in separate tanks but are put together when they are metered by the check platform 313 in Step 124. Hereinafter, the dust, the chip and the defective molded bodies will be generically called "regenerated powder".

Incidentally, the defective molded bodies are non-sintered molded bodies the sizes and shapes of which fail to satisfy the requirements. As the dust collector is used for recovering them from each process step, the defective molded bodies naturally collapse at the time of recovery, and change to powder to a certain extent when they are stored in the tank 311. Therefore, the regenerated powder is powder having non-uniform particle sizes, and a mean particle size is from 60 to 100 μm.

A predetermined amount of the regenerated powder is introduced into the deflocculation tank shown in FIG. 4 by means of the suction type transportation apparatus 324.

At the time of introduction, pure water is simultaneously introduced from the pure water tank 323 as shown in Step 126 in FIG. 4. The regenerated powder is deflocculated to obtain regenerated slurry as shown in Step 127.

Deflocculation in this Step 125 will be explained in further detail.

Pure water is introduced with regenerated powder into a deflocculation tank 330. An agitator provided to the tank 330 is driven simultaneously with this introduction.

The introduction amount of regenerated powder is 200 kg and that of pure water, 170 kg. The driving frequency of the agitator is 10 Hz.

Next, the internal pressure of the deflocculation tank 330 is reduced by a vacuum pump 336 connected to a dust collector 335, and the mixture of regenerated powder and pure water is defoamed.

The driving frequency of the agitator during defoaming is 25 Hz, and the internal pressure of the deflocculation tank 330 is kept at −53 to −80 kPa. Incidentally, defoaming is carried out for at least 30 minutes.

Next, the driving frequency of the agitator is changed to 40 Hz to conduct agitation inside the deflocculation tank 330. The internal pressure of the deflocculation tank 330 is from −65 to −100 kPa at this time. Deflocculation is carried out for 1.5 hours. Consequently, a regenerated powder is deflocculated to a mean particle size of 0.5 to 0.6 μm that is substantially equal to the mean particle size of new powder.

A pump 337 feeds the regenerated slurry inside the deflocculation tank 330 to two slurry tanks 341 and 342.

After this feeding, 40 kg of pure water is introduced and the agitator is driven at a driving frequency of 5 Hz for 5 minutes to wash the deflocculation tank 330 and to remove regenerated slurry adhering to the tank 330.

Next, as shown in Step 130, the new slurry and the regenerated slurry are mixed in these slurry tanks 341 and 342. At this time, the regenerated slurry and the new slurry are alternately introduced, and the slurry tanks 341 and 342 are filled to predetermined amounts to conduct the mixing step.

In other words, the regenerated slurry is first introduced into the slurry tank 341. At this time, the passage of the regenerated slurry and the passage of the new slurry extending to the slurry tank 342 are stopped by valves, respectively.

After a predetermined amount of the regenerated slurry is introduced, the passage of the regenerated slurry extending to the slurry tank 341 is stopped while the passage of the regenerated slurry extending to the slurry tank 342 is opened. While the passage of the new slurry extending to the slurry tank 341 is opened, the new slurry is introduced into the slurry tank 341 and the regenerated slurry is introduced into the slurry tank 342.

After the predetermined amounts of the new slurry and regenerated slurry are introduced into the slurry tanks 341 and 342, respectively, the regenerated slurry is introduced this time into the slurry tank 341 and the new slurry is introduced into the slurry tank 342.

This procedure is repeated. Namely, the regenerated slurry and the new slurry are introduced into both slurry tanks 341 and 342 in the sequence of the regenerated slurry first followed by the new slurry, the regenerated slurry and the new slurry.

During this introducing operation, the agitators 343 and 344 respectively provided to both slurry tanks 341 and 342 are driven to conduct agitation.

The mixing step described above provides the mixed slurry as shown in Step 131.

After the mixed slurry is sufficiently agitated, a pump 345 transfers the mixed slurry to a service tank 353.

A vibration sieve 351 and an iron removing device 352 are disposed upstream of the service tank 353. The vibration sieve 351 removes particles having large particles sizes from inside the mixed slurry. The iron-removing device 353 removes iron dust mixed as impurities in the regenerated powder, in particular (since the material is generally transferred through pipes between respective process steps, iron of the piping arrangement often admixes). The iron-removing device 352 is made of an electromagnet.

In Step 133, a binder as an adhesive is introduced into the mixed slurry, to attain a predetermined concentration, inside the service tank 353.

An agitator 354 further sufficiently agitates the mixed slurry inside the service tank 353, and the binder, that might become insufficient for obtaining the primary molded body in the subsequent process steps, is supplemented.

In other words, since the regenerated powder is recovered from the steps after the introducing step of the binder, a certain amount of the binder adheres to the regenerated powder. Therefore, the regenerated slurry contains the binder.

This means that the amount of the binder introduced in Step 133 is the amount that supplements insufficiency at the time of molding. The supplementation amount of the binder is determined from the proportion of the regenerated slurry to the new slurry.

The mixed slurry is transferred from the service tank 353 to a spray dryer 360.

Next, the mixed slurry is introduced into the spray dryer in Step 134 and is granulated (granulation step).

Figure 2:
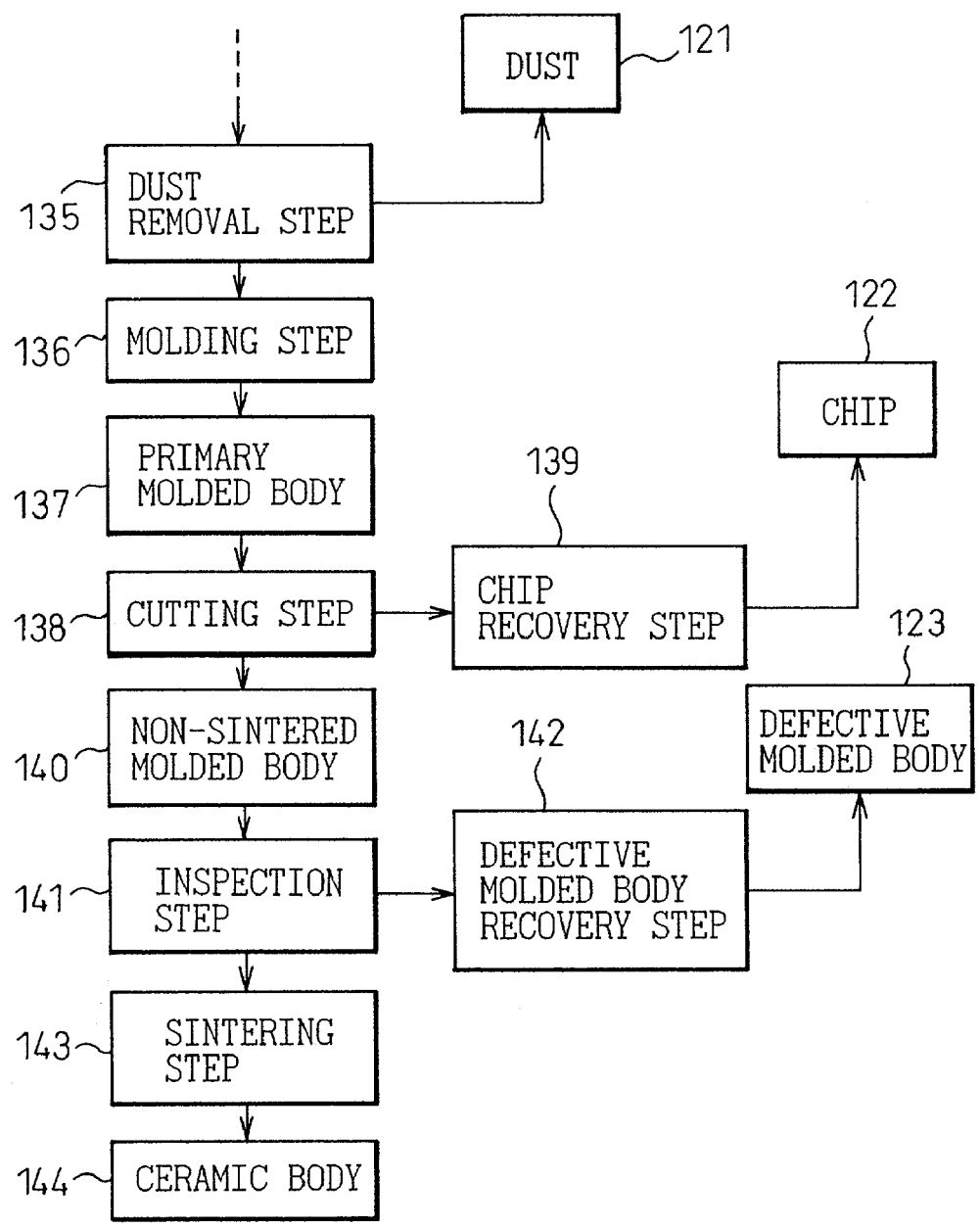
FIG. 2 is an explanatory view showing the process flow of the production method of the ceramic body in Embodiment 1 and continues from FIG. 1.

In Step 135 shown in FIG. 2, dust not reaching a predetermined particle size is removed from the resulting granulated powder by using a sieve (dust removal step).

The dust removed hereby is transferred to Step 121 and is used as regenerated powder.

Next, a molding step of the slurry containing the granulated powder obtained in Step 136 is carried out, and the primary molded body is obtained as shown in Step 137. A grinding step for cutting the primary molded article into a predetermined shape by using a grinding wheel is carried out in Step 138 to obtain a non-sintered molded body shown in Step 140. A dust collector collects the chips occurring during this cutting step in a chip recovery step 139 and the chips are used as regenerated powder in Step 122 in FIG. 1.

Next, the resulting non-sintered molded body is inspected in an inspection step of Step 141 to check whether or not it has a predetermined shape and size. The dust collector collects the molded articles that are rejected as defectives in this inspection step from the step in a defective molded body recovery step of Step 142 and are used as regenerated powder in Step 123.

The defective molded bodies recovered by the dust collector are pulverized to powder.

The non-sintered molded body is sintered in air in a sintering step of Step 143, and a ceramic body of this example is obtained as shown in Step 144.

Thereafter, plating is applied to the surface of this ceramic body to form internal and external electrodes 211 and 212. Plasma spraying is applied to the external electrode 212 to form a spray layer 22, and dipping is conducted to form a porous layer 23. As a result, a gas sensor device 2 can be obtained as shown in FIGS. 7 and 8.

Next, the function and effect of this example will be explained.

In this example, the dust recovered in the dust removal step, the chips occurring during cutting of the primary molded body and the defectives in the inspection step, that occur in the production process of the ceramic body from new starting powder and have been discarded in the past, are recovered, deflocculated and mixed as the regenerated slurry with the new slurry.

The non-sintered molded body is produced from such a mixed slurry through various process steps and is sintered to give the ceramic body.

Therefore, this example can effectively utilize new starting powder without waste.

This example can thus provide a production method of a ceramic body that can re-utilize the wastes and defectives occurring in the production process.

Since the agitator is used for agitation during the deflocculation process, the shearing force can be imparted to the slurry. Therefore, deflocculation can be carried out efficiently, and the deflocculation rate can be improved.

The deflocculation step is carried out under the vacuum deaerated state. Therefore, bubbling does not easily occur, and a granulated powder having internal voids is not formed easily.

EXAMPLE 2

This example explains a method using a flat vane and a biaxial butterfly in place of the agitator in the deflocculation step described above.

Figure 9:
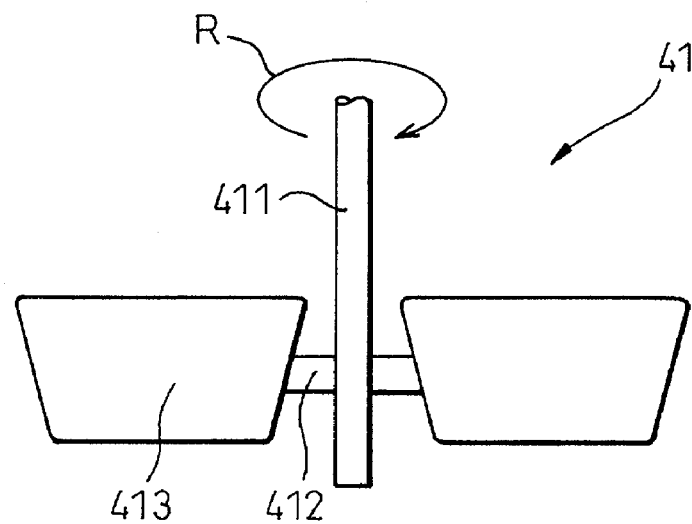
FIG. 9 is an explanatory view of a flat vane in Embodiment 2.

As shown in FIG. 9, a flat vane 41 having a structure in which a rotary shaft 411 and vanes 413 having a shaft 412 extending in a direction orthogonal to the rotary shaft 411 are installed in a deflocculation vessel.

Figure 10:
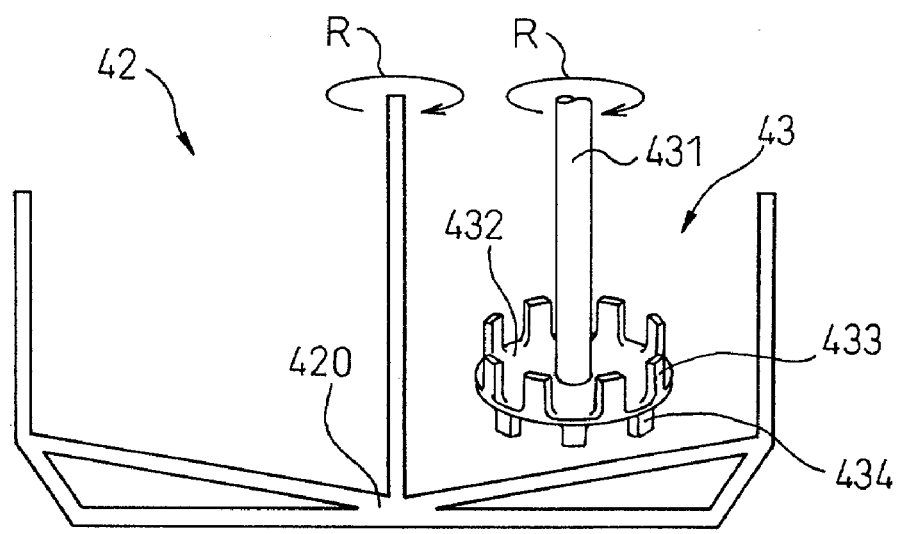
FIG. 10 is an explanatory view of a biaxial butterfly in Embodiment 2.

As shown in FIG. 10, a biaxial butterfly 42 comprising the combination of a turbine type impeller 420 and a butterfly vane 43 is installed in the deflocculation vessel.

The butterfly vane 43 includes a disc-like main body 432 and a center shaft 431 extending in a vertical direction from the center of the disc-like main body 432. The disc-like main body 432 has a plurality of projections 433 and 434 that are equidistantly arranged with predetermined gaps in the outer circumferential direction of the disc-like main body 432 in such a fashion as to project both upward and downward from the disc-like main body 432.

These flat vane 41 and biaxial butterfly 42 are rotated during deflocculation in the same way as the rotor of the agitator of Example 1 so that agitation can be carried out inside the deflocculation vessel.

Incidentally, arrows R represent the rotating directions in FIGS. 9 and 10.

Next, dispersion performance of the regenerated powder is measured for each of the (1) flat vane, (2) agitator and (3) biaxial butterfly. The measurement items will be explained.

First, deflocculation is conducted by using each of (1) to (3). First, a deflocculation state of the regenerated powder is measured by using a sedimentograph grain size meter. The particles sifted down in a 2 μm-sieve are 93 wt % of the total weight in (1), 94 wt % in (2) and 94 wt % in (3).

The time required for reaching the state described above (the time required for the particles sifted down in the 2 μm-sieve to reach 93 wt % of the total weight in the case of (1), for example), that is, a deflocculation time, is 10 hours in (1), 2 hours in (2) and 6 hours in (3).

The particle condition of the particles after deflocculation is inspected through a scanning electron microscope for each of the cases (1) to (3). As a result, flocculated particles are not observed in all cases, and all the particles are deflocculated in the state of the primary particles.

When the viscosity of the regenerated slurry after deflocculation is measured, it is 500 cps in (1), 240 cps in (2) and 220 cps in (3). Incidentally, in the case of agitation by use of the flat vanes in (1), the internal pressure of the deflocculation vessel is not reduced to vacuum but agitation is carried out at a normal pressure.

As described above, it is possible to obtain the regenerated slurry sufficiently deflocculated when any of the deflocculation method using the means (1) to (3) is employed.

Therefore, a mixed slurry of the particles that are sufficiently deflocculated and have small particle sizes can be obtained from the regenerated slurry of each of (1) to (3). The ceramic body produced from this mixed slurry can exhibit excellent characteristics equivalent to the characteristics of the ceramic body produced from only a new slurry.

What is claimed is:

1. A method for producing a ceramic body comprising:
    a molding step of molding slurry containing granulated powder into a primary molded body;
    a cutting step of cutting the resulting primary molded body into a non-sintered molded body having a desired shape;
    a chip recovery step of recovering chips generated in said cutting step;
    a deflocculation step of deflocculating said chips recovered in said recovery step to obtain particles wherein at least 50% of the particles have a size below 5 μm, and mixing said obtained particles with water to obtain a regenerated slurry; and a step of molding said non-sintered molded body from at least the resulting regenerated slurry, and sintering said non-sintered molded body to obtain a ceramic body.

2. A method for producing a ceramic body according to claim 1, wherein said deflocculation step is conducted in such a fashion that at least 90% of the particles in the regenerated slurry have a particle size of not greater than 2 µm.

3. A method for producing a ceramic body according to claim 1, wherein at least new starting powder is converted to a slurry, and a new slurry obtained from a granulation step of granulating primary particles in the new slurry to granulated powder is mixed with said regenerated slurry.

* * * * *